United States Patent
Shimizu et al.

(10) Patent No.: US 8,175,777 B2
(45) Date of Patent: May 8, 2012

(54) CONTROL APPARATUS, CONTROL METHOD, AND COMPUTER-READABLE STORAGE MEDIUM FOR CONTINUOUSLY VARIABLE TRANSMISSION

(75) Inventors: Masanori Shimizu, Toyota (JP); Ryuji Chida, Toyota (JP); Takashi Yumoto, Okazaki (JP); Kenichi Yamaguchi, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 543 days.

(21) Appl. No.: 12/424,027

(22) Filed: Apr. 15, 2009

(65) Prior Publication Data
US 2010/0017080 A1   Jan. 21, 2010

(30) Foreign Application Priority Data
Apr. 16, 2008 (JP) .................................. 2008-106292

(51) Int. Cl.
G06F 7/00 (2006.01)

(52) U.S. Cl. ............................... 701/51; 477/34; 477/37
(58) Field of Classification Search ................ 701/1, 51, 701/57; 477/34, 37
See application file for complete search history.

(56) References Cited

U.S. PATENT DOCUMENTS

| | | | | |
|---|---|---|---|---|
| 5,057,061 A * | 10/1991 | Sakakibara et al. | .......... | 475/210 |
| 5,813,933 A * | 9/1998 | Tsukamoto et al. | ............ | 474/11 |
| 5,961,418 A * | 10/1999 | Taniguchi et al. | ............. | 477/47 |
| 6,764,421 B2 * | 7/2004 | Onogi | ............................. | 474/46 |
| 7,029,410 B2 * | 4/2006 | Sawada et al. | .................. | 474/28 |
| 7,693,636 B2 * | 4/2010 | Katou et al. | .................... | 701/54 |

FOREIGN PATENT DOCUMENTS

| JP | 2001-263473 | 9/2001 |
|---|---|---|
| JP | 2008-49775 | 3/2008 |

* cited by examiner

*Primary Examiner* — Paul N Dickson
*Assistant Examiner* — Nicole Verley
(74) *Attorney, Agent, or Firm* — Oblon, Spivak, McClelland, Maier & Neustadt, L.L.P.

(57) ABSTRACT

A control apparatus for a continuously variable transmission includes a clamping force increase portion. The continuously variable transmission includes a pair of a primary pulley and a secondary pulley on which a transmission belt is wound. A shift of the continuously variable transmission is performed by changing effective diameters of the primary pulley and the secondary pulley. The clamping force increase portion increases a belt clamping force when it is determined that a torque capacity is decreased by determining that drive power input to the primary pulley is decreased by an amount equal to or larger than a predetermined amount while the secondary pulley is in a stopped state or a substantially stopped state, as compared to when it is determined that the torque capacity is not decreased.

19 Claims, 9 Drawing Sheets

CONTROL APPARATUS, CONTROL METHOD, AND COMPUTER-READABLE STORAGE MEDIUM FOR CONTINUOUSLY VARIABLE TRANSMISSION

INCORPORATION BY REFERENCE

The disclosure of Japanese Patent Application No. 2008-106292 filed on Apr. 16, 2008 including the specification, drawings and abstract is incorporated herein by reference in its entirety.

BACKGROUND OF THE INVENTION

1. Field of the Invention

The invention relates to a control apparatus, a control method, and a computer-readable storage medium for a continuously variable transmission. More specifically, the invention relates to a technology in which a belt clamping force is optimally controlled in a range in which a transmission belt does not slip.

2. Description of the Related Art

A continuously variable transmission for a vehicle, which includes a continuously variable transmission mechanism, is available. The continuously variable transmission transmits power using a transmission belt wound on a primary pulley and a secondary pulley. The speed ratio of the transmission mechanism is continuously changed by changing effective diameters of the primary pulley and the secondary pulley. When employing the continuously variable transmission, because the speed ratio is continuously changed, it is possible to operate an engine so that an operating point of the engine is as close as possible to an optimum fuel efficiency curve.

In the continuously variable transmission, if a belt clamping force for clamping the transmission is high, torque transmission efficiency is low. Therefore, it is conceivable to decrease the belt clamping force for clamping the transmission belt. However, if the belt clamping force for clamping the transmission belt is decreased, the transmission belt slips on the primary pulley and/or the secondary pulley. As a result, the primary pulley, the secondary pulley, and the transmission belt may be worn, and the durability of the continuously variable transmission may be decreased. Therefore, the slip of the transmission belt is prevented by increasing the belt clamping force by a predetermined margin.

For example, if a vehicle provided with the above-described continuously variable transmission starts moving on an upward slope, and torque input to the continuously variable transmission is increased, the transmission belt may slip. For example, Japanese Patent Application Publication No. 2001-263473 (JP-A-2001-263473) describes a hydraulic pressure control apparatus for a continuously variable transmission, which is a technology for preventing the slip of the transmission belt. When a vehicle speed is low, and it is difficult to detect an output rotational speed, a shift control valve is opened, and thus, the belt clamping force for clamping the transmission belt becomes unstable. As a result, the transmission belt may slip on the pulley(s). Accordingly, when the vehicle speed is low, the hydraulic pressure control apparatus controls a hydraulic pressure based on a low-speed line pressure characteristic, to prevent the slip of the transmission belt. When the low-speed pressure characteristic is used, the line pressure is set to a value higher than a value set when a line pressure characteristic for normal traveling is used.

The hydraulic control apparatus for a continuously variable transmission described in the publication No. 2001-263473 controls the line pressure based on the vehicle speed. When the vehicle speed is low, the line pressure is increased, regardless of whether the input torque is increased and decreased while the vehicle is in a stopped state. That is, even if the belt is not likely to slip, the belt clamping force is increased as long as the vehicle speed is low. Therefore, a friction loss and a pump load are large.

SUMMARY OF THE INVENTION

The invention reliably prevents the slip of a transmission belt on a pulley when the transmission belt is likely to slip, and reduces a friction loss and a pump load in a range in which the transmission belt does not slip, when the transmission belt is not likely to slip.

A first aspect of the invention relates to a control apparatus for a continuously variable transmission that includes a pair of a primary pulley and a secondary pulley, wherein a transmission belt is wound on the primary pulley and the secondary pulley, and a shift of the continuously variable transmission is performed by changing effective diameters of the primary pulley and the secondary pulley. The control apparatus includes a clamping force increase portion that increases a belt clamping force when it is determined that a torque capacity is decreased by determining that drive power input to the primary pulley is decreased by an amount equal to or larger than a predetermined amount while the secondary pulley is in a stopped state or a substantially stopped state, as compared to when it is determined that the torque capacity is not decreased.

With the above-described configuration, when the drive power input to the primary pulley is decreased by an amount equal to or larger than the predetermined amount while the secondary pulley is in the stopped state or the substantially stopped state, that is, when the torque capacity is decreased, and thus, the transmission belt is likely to slip, the belt clamping force is increased. Therefore, it is not necessary to constantly apply the large belt clamping force to prevent the slip of the transmission belt. Thus, the belt clamping force is increased during the required minimum period. Accordingly, it is possible to reduce a friction loss and a pump loss. This is because when the torque input to the primary pulley is decreased, that is, large torque has been input to the primary pulley and the torque is decreased while the secondary pulley is in the stopped state or the substantially stopped state, the pressure between the transmission belt and the pulleys is decreased, and thus, the torque capacity is decreased.

In the above-described aspect, the clamping force increase portion may suppress an increase in the belt clamping force during a period from when it is determined that the torque capacity is decreased until when the drive power input to the primary pulley is increased.

With the above-described configuration, a timing at which the belt clamping force is increased is made close to a timing at which the transmission belt is estimated to slip if the belt clamping force is not increased. This reduces the period during which the belt clamping force is increased. Thus, it is possible to more effectively reduce the friction loss and the pump load. This is because it is considered that the transmission belt is likely to slip when the drive power input to the primary pulley exceeds the torque capacity after the torque capacity is decreased.

In the above-described aspect, when it is determined that a turning amount, by which the transmission belt is turned, has reached a predetermined turning amount, the clamping force increase portion may suppress an increase in the belt clamping force.

With the above-described configuration, the belt clamping force is increased until the torque capacity, which has been decreased, is increased and the transmission belt is not likely to slip. This reduces the period during which the belt clamping force is increased. Thus, it is possible to more effectively prevent the slip of the transmission belt, and to reduce the friction loss and the pump load. This is because as the transmission belt is turned, the pressure between the transmission belt and the pulleys, which has been decreased due to the increase and decrease in the torque input to the primary pulley, is gradually increased, and thus, the torque capacity is increased, that is, the torque capacity, which has been decreased, is increased.

In the above-described aspect, the clamping force increase portion may increase the belt clamping force with an increase in a number of times it is determined that the torque capacity is decreased.

With the above-described configuration, as the torque input to the primary pulley is increased and decreased a plurality of times, and a decrease amount, by which the torque capacity is decreased, is increased while the secondary pulley is in the stopped state, that is, as the transmission belt is more likely to slip, the belt clamping force is increased. Therefore, it is possible to more reliably prevent the slip of the transmission belt on the pulley(s).

In the above-described aspect, when it is determined that the torque capacity is decreased, the clamping force increase portion may increase the belt clamping force of one of the primary pulley and the secondary pulley, as compared to when it is determined that the torque capacity is not decreased.

With the above-described configuration, the slip of the transmission belt is prevented by increasing the belt clamping force of one of the primary pulley and the secondary pulley. That is, the belt clamping forces of both of the primary pulley and the secondary pulley are not increased. Therefore, it is possible to easily execute the control.

In the above-described aspect, when it is determined that the transmission belt slips after the belt clamping force of the one of the primary pulley and the secondary pulley is increased, the clamping force increase portion may increase the belt clamping force of the other of the primary pulley and the secondary pulley.

With the above-described configuration, when it is determined that the transmission belt slips after the belt clamping force of the one of the primary pulley and the secondary pulley is increased, the belt clamping force of the other of the primary pulley and the secondary pulley is increased. Thus, it is possible to suppress an increase the line pressure, and to further reduce the pump loss. This is because if it is determined that the transmission belt slips after the belt clamping force of the one of the primary pulley and the secondary pulley is increased, and the belt clamping force of the one pulley is further increased, the slip of the transmission belt is prevented only by the belt clamping force of the one pulley, and therefore, a high line pressure is required.

In the above-described aspect, the clamping force of the one of the primary pulley and the secondary pulley may be the clamping force of the primary pulley.

The pressure between the transmission belt and the primary pulley is likely to decrease. With the above-described configuration, the belt clamping force of the primary pulley is increased. Thus, it is possible to more effectively prevent the slip of the transmission belt. More specifically, when the drive power input to the primary pulley is increased and then decreased while the secondary pulley is in the stopped state, the pressure between the transmission belt and the pulleys is decreased, because large torque has been applied to the primary pulley, and the torque is decreased. Therefore, it is considered that the pressure between the transmission belt and the primary pulley is likely to decrease.

In the above-described aspect, the transmission belt may include a ring and an element that is engaged with the ring; and the transmission belt may transmit the drive power using the element.

With the above-described configuration, when the torque capacity is decreased because large torque has been applied to the elements and the torque is decreased, and thus, the transmission belt is likely to slip, the belt clamping force is increased. Therefore, it is not necessary to constantly apply a large belt clamping force, to prevent the slip of the transmission belt. Thus, the belt clamping forces is increased during the required minimum period. Accordingly, it is possible to reduce the friction loss and the pump load. More specifically, in the case where the belt including the ring and elements is employed, when the torque is input to the primary pulley while the secondary pulley is in the stopped state, the distance between the elements becomes short in a portion of the transmission belt. Then, if the torque input to the primary pulley is decreased, the elements are moved with respect to the pulleys so that the distance between the elements is increased, and thus, the pressure between the elements and the pulleys is decreased, because large torque has been applied to the portion of the belt in which the distance between the elements has been short, and the torque is decreased.

A second aspect of the invention relates to a method of controlling a continuously variable transmission that includes a pair of a primary pulley and a secondary pulley, wherein a transmission belt is wound on the primary pulley and the secondary pulley, and a shift of the continuously variable transmission is performed by changing effective diameters of the primary pulley and the secondary pulley. The method includes determining whether the secondary pulley is in a stopped state or a substantially stopped state; determining whether a torque capacity is decreased by determining whether drive power input to the primary pulley is decreased by an amount equal to or larger than a predetermined amount while it is determined that the secondary pulley is in the stopped state or the substantially stopped state; and increasing a belt clamping force when it is determined that the torque capacity is decreased, as compared to when it is determined that the torque capacity is not decreased.

With the above-described configuration, when a vehicle starts moving after the drive power input to the primary pulley is increased while the secondary pulley is in the stopped state or the substantially stopped state, and thus, the torque capacity is decreased, that is, when the transmission belt is likely to slip, the belt clamping force is increased. Therefore, it is not necessary to constantly apply the large belt clamping force to prevent the slip of the transmission belt. Accordingly, the belt clamping force is increased during the required minimum period. Thus, it is possible to reduce the friction loss and the pump loss. This is because when the torque input to the primary pulley is decreased, that is, large torque has been input to the primary pulley and the torque is decreased while the secondary pulley is in the stopped state or the substantially stopped state, the pressure between the transmission belt and the pulleys is decreased, and thus, the torque capacity is decreased.

A third aspect of the invention relates to a computer-readable storage medium storing a computer-readable code adapted to implement a method of controlling a continuously variable transmission that includes a pair of a primary pulley and a secondary pulley, wherein a transmission belt is wound on the primary pulley and the secondary pulley, and a shift of the continuously variable transmission is performed by changing effective diameters of the primary pulley and the secondary pulley. The method includes determining whether the secondary pulley is in a stopped state or a substantially stopped state; determining whether a torque capacity is decreased by determining whether drive power input to the primary pulley is decreased by an amount equal to or larger than a predetermined amount while it is determined that the secondary pulley is in the stopped state or the substantially stopped state; and increasing a belt clamping force when it is determined that the torque capacity is decreased, as compared to when it is determined that the torque capacity is not decreased.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
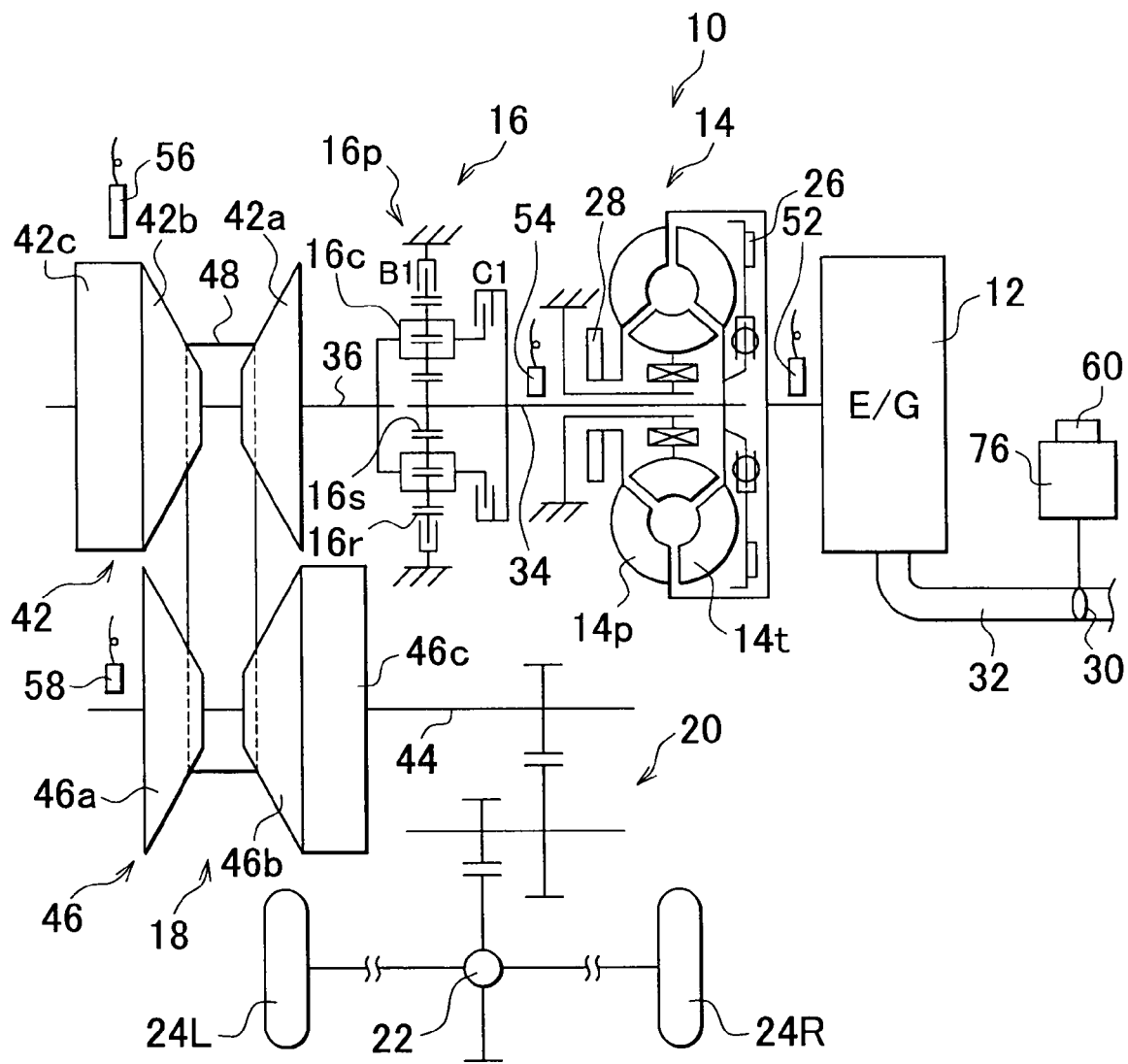
FIG. 1 is a schematic diagram showing a vehicle drive apparatus to which an embodiment of the invention is applied.

Hereinafter, a control apparatus for a continuously variable transmission according to an embodiment of the invention will be described with reference to FIG. 1 to FIG. 9. FIG. 1 is a schematic diagram showing the configuration of a vehicle drive apparatus 10 to which the invention is applied. The vehicle drive apparatus 10 is an automatic transmission that is transversely installed. The vehicle drive apparatus 10 may be used in a front-engine front-wheel-drive vehicle. An output from an engine 12 is transmitted to right and left wheels 24R and 24L through a torque converter 14, a forward-rearward movement switching device 16, a continuously variable transmission (CVT) 18, a reduction gear unit 20, and a differential mechanism 22.

The torque converter 14 includes a pump impeller 14p connected to the output shaft of the engine 12, and a turbine runner 14t connected to the output shaft of the torque converter 14. The torque converter 14 transmits power using fluid. A lock-up clutch 26 may be provided in the torque converter 14. The lock-up clutch 26 is engaged and disengaged by supplying a hydraulic pressure to an engagement-side oil chamber or a disengagement-side oil chamber using, for example, a lock-up control valve (not shown) in a hydraulic pressure control circuit. When the lock-up clutch 26 is completely engaged, the pump impeller 14p and the turbine runner 14t are integrally rotated.

The forward/rearward movement switching device 16 includes a clutch C1 for forward movement (hereinafter, referred to as "forward movement clutch C1"), a brake B1 for rearward movement (hereinafter, referred to as "rearward movement brake B1"), and a double pinion type planetary gear unit. The output shaft 34 of the torque converter 14 is integrally connected to a sun gear 16s. The input shaft of the continuously variable transmission 18 is integrally connected to a carrier 16c. The carrier 16c and the sun gear 16s are selectively connected to each other through the forward movement clutch C1. A ring gear 16r is selectively fixed to a housing 16p through the rearward movement brake B1. Each of the forward movement clutch C1 and the rearward movement brake B1 is a hydraulic friction engagement device that is frictionally engaged by a hydraulic cylinder. When the forward movement clutch C1 is engaged, and the rearward movement brake B1 is disengaged, a power transmission path for forward movement is formed. When the forward movement clutch C1 is disengaged, and the rearward movement brake B1 is engaged, a power transmission path for rearward movement is formed. When both of the forward movement clutch C1 and the rearward movement brake B1 are disengaged, power transmission is interrupted, i.e., the power transmission path is brought to a power transmission interrupted state (i.e., a neutral state).

The continuously variable transmission 18 includes a primary pulley 42, a secondary pulley 46, and a transmission belt 48 that is wound on the primary pulley 42 and the secondary pulley 46. The effective diameter of each of the primary pulley 42 and the secondary pulley 46 is variable. Power input to the primary pulley 42 is transmitted to the secondary pulley 46 through the transmission belt 48.

Figure 3:
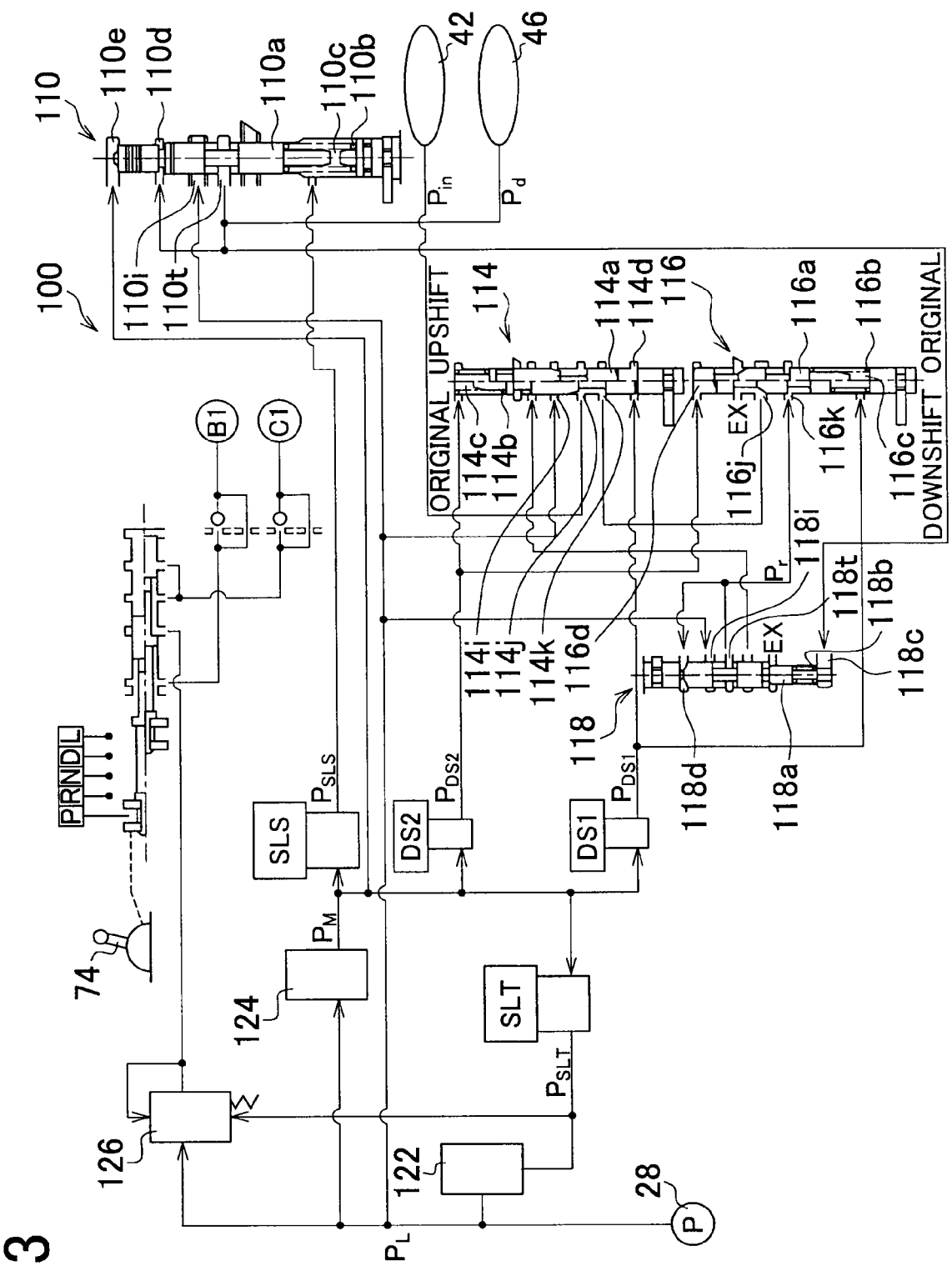
FIG. 3 is a hydraulic pressure circuit diagram showing a main portion of a hydraulic pressure control circuit, which relates to a belt clamping force control and a speed ratio control for a continuously variable transmission, and an engagement pressure control for a forward movement clutch or a rearward movement brake according to an operation of a shift lever.

The primary pulley 42 includes a fixed rotation body 42a, a movable rotation body 42b, and a primary hydraulic cylinder 42c. The fixed rotation body 42a is connected to the input shaft 36 of the continuously variable transmission 18. The movable rotation body 42b is provided on the input shaft 36 in a manner such that the movable rotation body 42b is unable to rotate relative to the input shaft 36 and the movable rotation body 42b is movable in an axial direction relative to the input shaft 36. The primary hydraulic cylinder 42c functions as a hydraulic actuator, and applies a thrust force for changing the width of a V-groove between the fixed rotation body 42a and the movable rotation body 42b. The secondary pulley 46 includes a fixed rotation body 46a, a movable rotation body 46b, and a secondary hydraulic cylinder 46c. The fixed rotation body 46a is fixed to the output shaft 44 of the continuously variable transmission 18. The movable rotation body 46b is provided on the output shaft 44 in a manner such that the movable rotation body 46b is unable to rotate relative to the output shaft 44 and the movable rotation body 46b is movable in the axial direction relative to the output shaft 44. The secondary hydraulic cylinder 46c functions as a hydraulic actuator, and applies a thrust force for changing the width of a V-groove between the fixed rotation body 46a and the movable rotation body 46b. The width of the V-grooves of the variable pulleys 42 and 46 are changed, and the effective diameters of the variable pulleys 42 and 46 are changed, and thus, a speed ratio γ (=an input shaft rotational speed $N_{IN}$/output shaft rotational speed $N_{OUT}$) is continuously changed, by controlling the flow rate of hydraulic fluid supplied to the primary hydraulic cylinder 42c, and the flow rate of the hydraulic fluid discharged from the primary hydraulic cylinder 42c using a hydraulic pressure control circuit 100 (FIG. 3). As a result of executing the control, a primary pressure Pin, which is the hydraulic pressure for the primary hydraulic cylinder 42c, is generated. Also, a secondary pressure Pd, which is the pressure for the secondary hydraulic cylinder 46c, is controlled to prevent the slip of the transmission belt 48, using the hydraulic pressure control circuit 100.

Figure 2:
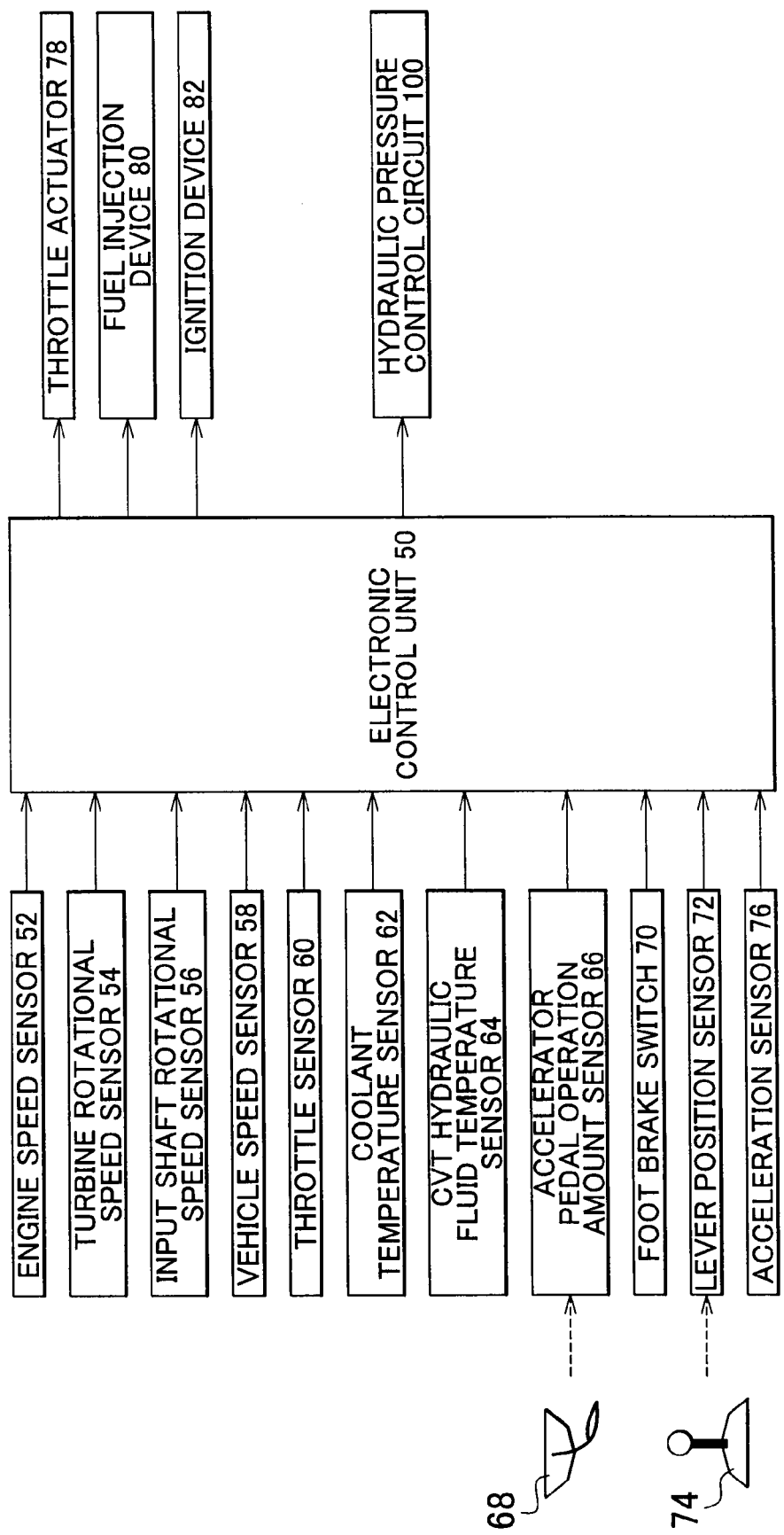
FIG. 2 is a block diagram showing main portions of a control system that is provided in a vehicle to control, for example, the vehicle drive apparatus in FIG. 1.

FIG. 2 is a block diagram showing main portions of a control system for a vehicle to control, for example, the vehicle drive apparatus 10 in FIG. 1. An electronic control unit 50 includes, for example, a CPU, a RAM, a ROM, and an input/output interface. For example, the CPU executes an output control for the engine 12, a shift control and a belt clamping force control for the continuously variable transmission 18, and a torque capacity control for the lock-up clutch 26, by executing signal processing according to programs stored in advance in the ROM, using the temporary storage function of the RAM. For example, the CPU for controlling the engine 12 and the CPU for controlling the hydraulic pressure for the continuously variable transmission 18 and the lock-up clutch 26 may be separately configured.

The electronic control unit 50 receives a signal indicating a crankshaft rotational speed corresponding to a crankshaft rotational angle $A_{CR}$ and an engine speed $N_E$ detected by an engine speed sensor 52; a signal indicating a turbine rotational speed $N_T$ detected by a turbine rotational speed sensor 54; a signal indicating an input shaft rotational speed $N_{IN}$ which is a rotational speed input to the continuously variable transmission 18, and which is detected by an input shaft rotational speed sensor 56; a vehicle speed signal indicating a vehicle speed V corresponding to an output shaft rotational speed $N_{OUT}$ that is a rotational speed output from the continuously variable transmission 18, the vehicle speed V being detected by a vehicle speed sensor 58; a throttle valve opening amount signal indicating an opening amount $\theta_{TH}$ of an electronic throttle valve 30 provided in an intake pipe 32 (refer to FIG. 1) of the engine 12, the opening amount $\theta_{TH}$ being detected by a throttle sensor 60; a signal indicating a coolant temperature $T_W$ that is the temperature of a coolant for the engine 12, the coolant temperature $T_W$ being detected by a coolant temperature sensor 62; a signal indicating a hydraulic fluid temperature $T_{CVT}$ that is the temperature of the hydraulic fluid in the hydraulic pressure circuit for, for example, the continuously variable transmission 18, the hydraulic fluid temperature $T_{CVT}$ being detected by a CVT hydraulic fluid temperature sensor 64; a signal indicating an accelerator pedal operation amount $A_{CC}$ that is the operation amount of an accelerator pedal 68, the accelerator pedal operation amount $A_{CC}$ being detected by an accelerator pedal operation amount sensor 66; a brake operation signal indicating the operating state $B_{ON}$ of a foot brake that is a regular brake, the operating state of the foot brake being detected by a foot brake switch 70; an operational position signal indicating a lever position $P_{SH}$ of a shift lever 74, the lever position $P_{SH}$ being detected by a lever position sensor 72; and a signal indicating acceleration G in the longitudinal direction of the vehicle, the acceleration G being detected by an acceleration sensor 76.

The electronic control unit 50 outputs, to the hydraulic pressure control circuit 100, an engine output control command signal SE for controlling the output from the engine 12, for example, a throttle signal for driving a throttle actuator 78 to control the opening and closing of the electronic throttle valve 30, an injection signal for controlling the amount of fuel injected from a fuel injection device 80, and an ignition timing signal for controlling an ignition timing of the engine 12, at which an ignition device 82 performs ignition. Also, the electronic control unit 50 outputs a shift control command signal $S_T$ for changing the speed ratio γ of the continuously variable transmission 18, for example, a command signal for driving a solenoid valve DS1 (FIG. 3) and a solenoid valve DS2 (FIG. 3) that control the flow rate of the hydraulic fluid supplied to, and discharged from the primary hydraulic cylinder 42c; and a clamping force control command signal $S_B$ for adjusting the belt clamping force for clamping the transmission belt 48, for example, a command signal for driving a linear solenoid valve SLS (FIG. 3) that adjusts the secondary pressure Pd, and a command signal for driving a linear solenoid valve SLT (FIG. 3) that controls a line hydraulic pressure $P_L$.

The shift lever 74 is provided so that a driver uses the shift lever 74 to select a shift position. The shift lever 74 is manually moved to lever positions "P", "R", "N", "D", and "L" (refer to FIG. 3), which are sequentially arranged.

The position "P" is a parking position used to bring the power transmission path in the vehicle drive apparatus 10 to the power transmission interrupted state, and to mechanically lock the rotation of the output shaft 44 using a mechanical parking mechanism. The position "R" is a position for rearward movement, which is used to rotate the output shaft 44 in a reverse direction. The position "N" is a neutral position used to bring the power transmission path in the vehicle drive apparatus 10 to the power transmission interrupted state. The position "D" is a position for forward movement, which is used to select an automatic shift mode, and to execute an automatic shift control in a shift range in which the shift of the continuously variable transmission 18 is permitted. The position "L" is an engine brake position used to apply a strong engine brake. Thus, the position "P" and the position "N" are non-traveling positions that are selected when the vehicle needs to be stopped. The position "R", the position "D", and the position "L" are traveling positions that are selected when the vehicle needs to travel.

FIG. 3 is a hydraulic pressure circuit diagram that shows a main portion of the hydraulic pressure control circuit 100, which relates to the belt clamping force control and the shift control for the continuously variable transmission 18. In FIG. 3, the hydraulic pressure control circuit 100 includes a secondary pressure control valve 110 that adjusts mainly the secondary pressure Pd, which is the hydraulic pressure for the secondary hydraulic cylinder 46c, to prevent the slip of the transmission belt 48; and a speed ratio control valve UP 114 and a speed ratio control valve DN 116 that control mainly the flow rate of the hydraulic fluid supplied to, and discharged from the primary hydraulic cylinder 42c to continuously change the speed ratio γ; and a thrust-force-ratio control valve 118 that controls a ratio between the primary pressure Pin and the secondary pressure Pd to a predetermined ratio.

The line hydraulic pressure $P_L$ is adjusted by a primary regulator valve (a line hydraulic pressure regulator valve)

122, using, as a source pressure, the pressure of the hydraulic fluid output from a mechanical oil pump 28 that is rotated by the engine 12. For example, the primary regulator valve 122 is a relief type valve. The line hydraulic pressure $P_L$ is adjusted according to, for example, an engine load, based on a control hydraulic pressure $P_{SLT}$, which is the hydraulic pressure output from the linear solenoid valve SLT. A modulator hydraulic pressure $P_M$ serves as a source pressure of the control hydraulic pressure $P_{SLT}$ and a control hydraulic pressure $P_{SLS}$, which is a hydraulic pressure output from the linear solenoid valve SLS. Also, the modulator hydraulic pressure $P_M$ serves as a source pressure of a control hydraulic pressure $P_{DS1}$, which is a hydraulic pressure output from the solenoid valve DS1, and a control hydraulic pressure $P_{DS2}$, which is a hydraulic pressure output from the solenoid valve DS2. The electronic control unit 50 executes a duty ratio control for each of the solenoid valve DS1 and the solenoid valve DS2. The modulator hydraulic pressure $P_M$ is adjusted to a constant pressure by a modulator valve 124 using the line hydraulic pressure $P_L$ as a source pressure.

The speed ratio control valve UP 114 includes a spool valve element 114a, a spring 114b, an oil chamber 114c, and an oil chamber 114d. The spool valve element 114a is movable in the axial direction. The spool valve element 114a is located at an upshift position or an original position. When the spool valve element 114a is located at the upshift position, the line hydraulic pressure $P_L$ is supplied to the primary pulley 42 through an input port 114i and an input/output port 114j, and an input/output port 114k is closed. When the spool valve element 114a is located at the original position, the primary pulley 42 is connected to the input/output port 114k through the input/output port 114j. The spring 114b urges the spool valve element 114a toward the original position. The spring 114b is housed in the oil chamber 114c. The oil chamber 114c receives the control hydraulic pressure $P_{DS2}$ to apply the thrust force to the spool valve element 114a in a direction toward the original position. The oil chamber 114d receives the control hydraulic pressure $P_{DS1}$ to apply the thrust force to the spool valve element 114a in a direction toward the upshift position.

The speed ratio control valve DN 116 includes a spool valve element 116a, a spring 116b, an oil chamber 116c, and an oil chamber 116d. The spool valve element 116a is movable in the axial direction. The spool valve element 116a is located at a downshift position or an original position. When the spool valve element 116a is located at the downshift position, an input/output port 116j is connected to an exhaust port EX. When the spool valve element 116a is located at the original position, the input/output port 116j is connected to an input/output port 116k. The spring 116b urges the spool valve element 116a toward the original position. The spring 116b is housed in the oil chamber 116c. The oil chamber 116c receives the control hydraulic pressure $P_{DS1}$ to apply the thrust force to the spool valve element 116a in a direction toward the original position. The oil chamber 116d receives the control hydraulic pressure $P_{DS2}$ to apply the thrust force to the spool valve element 116a in a direction toward the downshift position.

In the speed ratio control valve UP 114 and the speed ratio control valve DN 116 with the above-described configuration, when the spool valve element 114a is maintained at the original position due to the urging force of the spring 114b, that is, when the speed ratio control valve UP 114 is in a closed state as shown in a portion of the speed ratio control valve UP 114 on the left side of a centerline in FIG. 3, the input/output port 114j is connected to the input/output port 114k, and thus, the hydraulic fluid in the primary pulley 42 is permitted to flow to the input/output port 116j. When the spool valve element 116a is maintained at the original position due to the urging force of the spring 116b, that is, when the speed ratio control valve DN 116 is in a closed state as shown in a portion of the speed ratio control valve DN 116 on the right side of the centerline in FIG. 3, the input/output port 116j is connected to the input/output port 116k, and thus, a thrust force ratio control hydraulic pressure Pτ output from the thrust-force-ratio control valve 18 is permitted to flow to the input/output port 114k.

When the control hydraulic pressure $P_{DS1}$ is supplied to the oil chamber 114d, the spool valve element 114a is moved toward the upshift position against the urging force of the spring 114b due to the thrust force corresponding to the control hydraulic pressure $P_{DS1}$ as shown in a portion of the speed ratio control valve UP 114 on the right side of the centerline in FIG. 3, and the line hydraulic pressure $P_L$ is supplied to the primary hydraulic cylinder 42c through the input port 114i and the input/output port 114j at the flow rate corresponding to the control hydraulic pressure $P_{DS1}$. In addition, the input/output port 114k is closed, and thus, the flow of the hydraulic fluid toward the speed ratio control valve DN 116 is blocked. As a result, the primary pressure Pin is increased, and the width of the V-groove of the primary pulley 42 is decreased, and accordingly, the speed ratio γ is decreased. That is, the continuously variable transmission 18 upshifts.

When the control hydraulic pressure $P_{DS2}$ is supplied to the oil chamber 116d, the spool valve element 116a is moved toward the downshift position against the urging force of the spring 116b due to the thrust force corresponding to the control hydraulic pressure $P_{DS2}$, as shown in a portion of the speed ratio control valve DN 116 on the left side of the centerline in FIG. 3, and the hydraulic fluid in the primary hydraulic cylinder 42c is discharged from the exhaust port EX through the input/output port 114j, the input/output port 114k, and the input/output port 116j. As a result, the primary pressure Pin is decreased, and the width of the V-groove of the primary pulley 42 is increased, and accordingly, the speed ratio γ is increased. That is, the continuously variable transmission 18 downshifts.

Thus, the line hydraulic pressure $P_L$ serves as the source pressure of the primary pressure Pin. When the control hydraulic pressure $P_{DS1}$ is output, the line hydraulic pressure $P_L$ input to the speed ratio control valve UP 114 is supplied to the primary hydraulic cylinder 42c, and accordingly, the primary pressure Pin is increased, and the continuously variable transmission 18 continuously upshifts. When the control hydraulic pressure $P_{DS2}$ is output, the hydraulic fluid in the primary hydraulic cylinder 42c is discharged from the exhaust port EX, and accordingly, the primary pressure Pin is decreased, and the continuously variable transmission 18 continuously downshifts.

Figure 4:
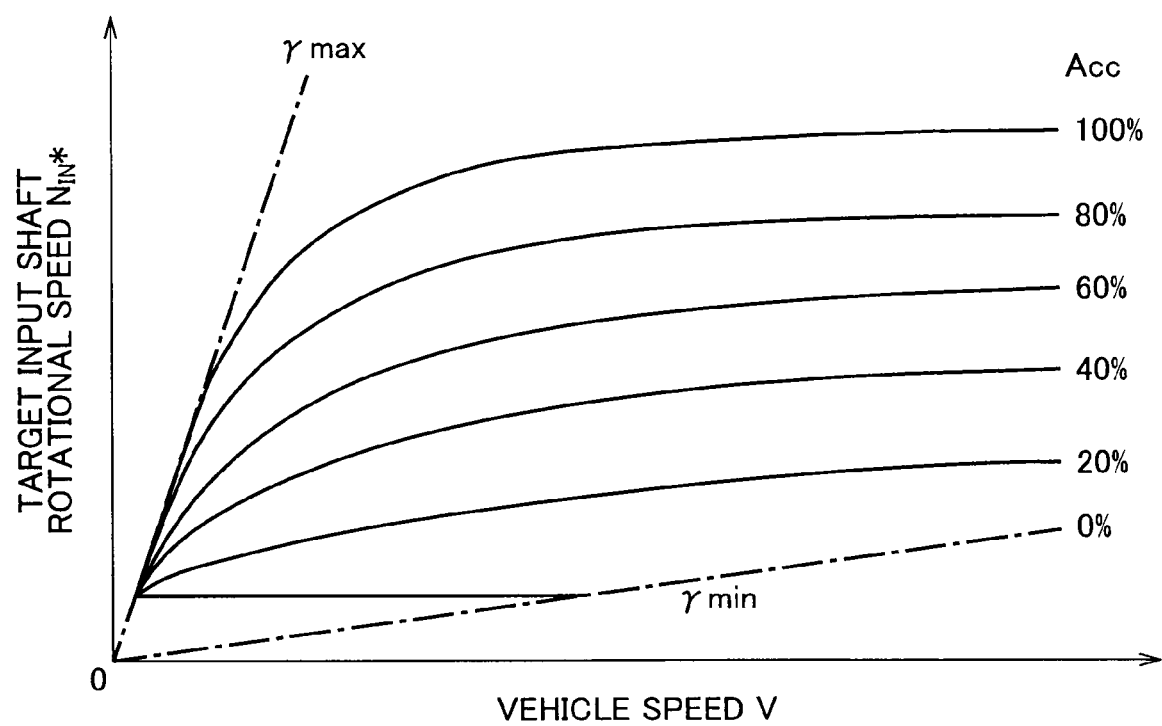
FIG. 4 is a diagram showing an example of a shift map used to determine a target input shaft rotational speed in the shift control for the continuously variable transmission.

For example, a relation between the vehicle speed V and a target input shaft rotational speed $N_{IN}^*$, which is a target rotational speed input to the continuously variable transmission 18, is set in advance (i.e., a shift map is set in advance) using the accelerator pedal operation amount $A_{CC}$ as a parameter, as shown in FIG. 4. The target input shaft rotational speed $N_{IN}^*$ is set based on a vehicle state indicated by the actual vehicle speed V and the actual accelerator pedal operation amount $A_{CC}$, using the relation (the shift map). The shift of the continuously variable transmission 18 is performed according to a difference $\Delta N_{IN}$ (=$N_{IN}^*$−$N_{IN}$) between the target input shaft rotational speed $N_{IN}^*$ and an actual input shaft rotational speed (hereinafter, referred to as "actual input shaft rotational speed) $N_{IN}$ by executing a feedback control so that the actual input shaft rotational speed $N_{IN}$ matches the target input shaft rotational speed $N_{IN}*$. That is, the widths of the V-grooves of the variable pulleys 42 and 46 are changed by supplying/discharging the hydraulic fluid to/from the primary hydraulic cylinder 42c, and thus, the speed ratio γ is continuously changed by the feedback control.

The shift map shown in FIG. 4 may be regarded as a shift condition. The target input shaft rotational speed $N_{IN}*$ is set so that the speed ratio γ is increased as the accelerator pedal operation amount $A_{CC}$ increases when the vehicle speed V is low. Because the vehicle speed V corresponds to the output shaft rotational speed $N_{OUT}$, the target input shaft rotational speed $N_{IN}*$, which is the target value of the input shaft rotational speed $N_{IN}$, corresponds to a target speed ratio γ* ($=N_{IN}*/N_{OUT}$). The target speed ratio γ* is set in a range of the minimum speed ratio γmin to the maximum speed ratio γmax.

The secondary pressure control valve 110 includes a spool valve element 110a, a spring 110b, an oil chamber 110c, a feedback oil chamber 110d, and an oil chamber 110e. The spool valve element 110a is movable in the axial direction. Thus, the spool valve element 110a opens/closes an input port 110i so that the line hydraulic pressure $P_L$ is input to the secondary pressure control valve 110 through the input port 110i, and the secondary pressure Pd is output from an output port 110t, and supplied to the secondary pulley 46 and the thrust-force-ratio control valve 118. The spring 110b urges a spool valve element 110a in a valve-opening direction. The spring 110b is housed in the oil chamber 110c. The oil chamber 110c receives the control hydraulic pressure $P_{SLS}$ to apply a thrust force to the spool valve element 110a in the valve-opening direction. The feedback oil chamber 110d receives the secondary pressure Pd output from the output port 110t, to apply a thrust force to the spool valve element 110a in a valve-closing direction. The oil chamber 110e receives the modulator hydraulic pressure $P_M$ to apply a thrust force to the spool valve element 110a in the valve-closing direction.

In the secondary pressure control valve 110 with the above-described configuration, the secondary pressure Pd is output from the output port 110t, by continuously adjusting the line hydraulic pressure $P_L$ using the control hydraulic pressure $P_{SLS}$ as a pilot pressure, to prevent the slip of the transmission belt 48. Thus, the line hydraulic pressure $P_L$ serves as the source pressure of the secondary pressure Pd.

Figure 5:
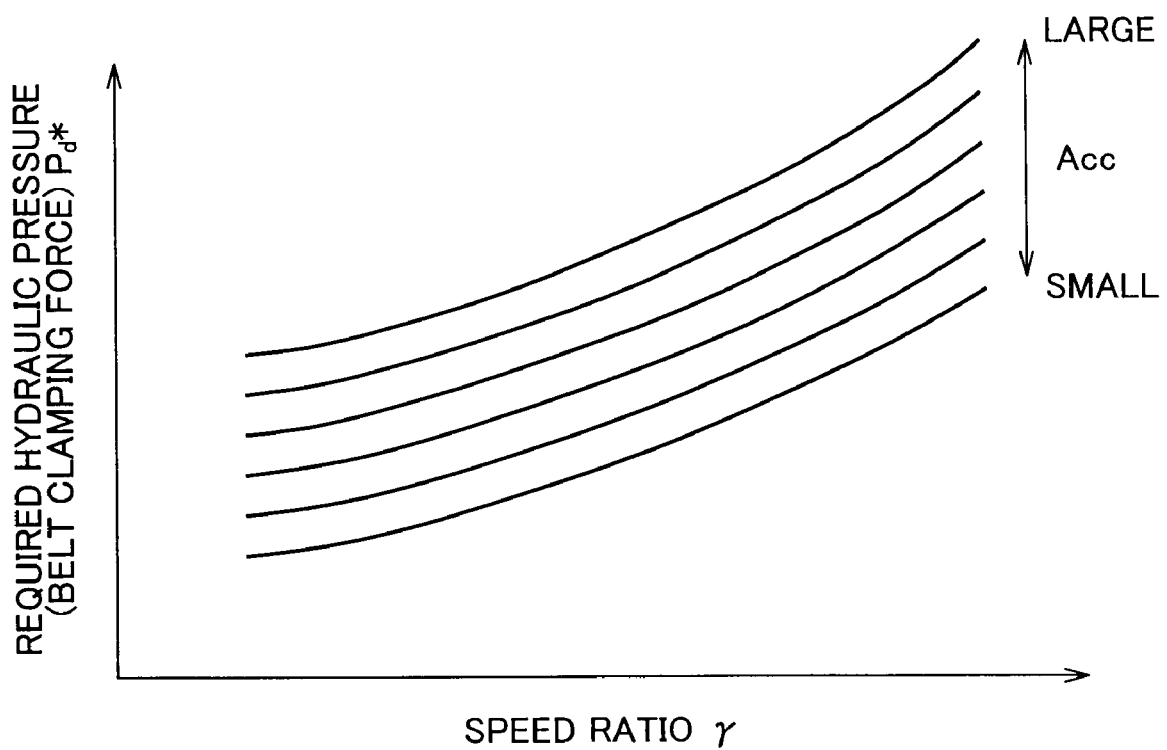
FIG. 5 is a diagram showing an example of a required hydraulic pressure map used to determine a required hydraulic pressure according to, for example, the speed ratio in the belt clamping force control for the continuously variable transmission.

For example, a relation between the speed ratio γ and a required hydraulic pressure (a required secondary pressure, a belt clamping force) Pd* is empirically set and stored in advance to prevent the slip of the transmission belt 48, using the accelerator pedal operation amount $A_{CC}$ corresponding to transmission torque as a parameter, as shown in FIG. 5. That is, a secondary pressure map is set as shown in FIG. 5. The required secondary pressure Pd* is determined (calculated) based on the vehicle state indicated by the actual speed ratio γ and the actual accelerator pedal operation amount $A_{CC}$, using the secondary pressure map. The secondary pressure Pd for the secondary hydraulic cylinder 46c is controlled to obtain the required secondary pressure Pd*. The secondary pressure Pd, that is, a friction force between the variable pulleys 42 and 46 and the transmission belt 48 is increased or decreased according to the required secondary pressure Pd*.

The thrust-force-ratio control valve 118 includes a spool valve element 118a, a spring 118b, an oil chamber 118c, and a feedback oil chamber 118d. The spool valve element 118a is movable in the axial direction. Thus, the spool valve element 118 opens/closes an input port 118i so that the line hydraulic pressure $P_L$ is input to the thrust-force-ratio control valve 118 through the input port 118i, and the thrust force ratio control hydraulic pressure PT is output from an output port 118t, and supplied to the speed ratio control valve DN 116. The spring 118b urges a spool valve element 118a in a valve-opening direction. The spring 118b is housed in the oil chamber 118c. The oil chamber 118c receives the secondary pressure Pd to apply a thrust force in the valve-opening direction to the spool valve element 118a. The feedback oil chamber 118d receives the thrust force ratio control hydraulic pressure PT output from the output port 118t, to apply a thrust force in a valve-closing direction to the spool valve element 118a.

When neither the control hydraulic pressure $P_{DS1}$ nor the control hydraulic pressure $P_{DS2}$ is supplied, or when both of the control hydraulic pressure $P_{DS1}$ and the control hydraulic pressure $P_{DS2}$, which are equal to or higher than predetermined pressures, are supplied, and accordingly, both of the speed ratio control valve UP 114 and the speed ratio control valve DN 116 are maintained at the original positions, that is, both of the speed ratio control valve UP 114 and the speed ratio control valve DN 116 are in the closed states, the thrust-force-ratio control hydraulic pressure PT is supplied to the primary hydraulic cylinder 42c, and therefore, the primary pressure Pin matches the thrust-force-ratio control hydraulic pressure Pτ. In other words, the thrust-force-ratio control valve 118 outputs the thrust-force-ratio control hydraulic pressure Pτ that maintains the ratio between the primary pressure Pin and the secondary pressure Pd at the predetermined ratio, that is, the primary pressure Pin.

For example, when the vehicle speed is low, that is, when the vehicle speed is lower than a predetermined vehicle speed V', the accuracy with which the input-shaft rotational speed sensor 56 detects the input shaft rotational speed $N_{IN}$ and the accuracy with which the vehicle speed sensor 58 detects the vehicle speed V are low. Therefore, when the vehicle travels at a low speed or when the vehicle starts moving, for example, a so-called confinement control is executed instead of executing the feedback control of the speed ratio γ to reduce the rotational speed difference $\Delta N_{IN}$ to zero. In the confinement control, neither the control hydraulic pressure $P_{DS1}$ nor the control hydraulic pressure $P_{DS2}$ is supplied, and both of the speed ratio control valve UP 114 and the speed ratio control valve DN 116 are in the closed states. Thus, when the vehicle travels at a low speed, or when the vehicle starts moving, the primary pressure Pin, which is proportional to the secondary pressure Pd, is supplied to the primary hydraulic cylinder 42c so that the ratio between the primary pressure Pin and the secondary pressure Pd is maintained at the predetermined ratio. Therefore, during a period from when the vehicle is stopped to when the vehicle travels at an extremely low speed, the slip of the transmission belt 48 is prevented. In addition, for example, if the thrust force ratio τ can be set to a value larger than a value corresponding to the maximum speed ratio γmax, the vehicle appropriately starts moving at the maximum speed ratio γmax or a speed ratio γmax' near the maximum speed ratio γmax. The predetermined vehicle speed V' is the vehicle speed V at which the rotational speed of a predetermined rotational member, for example, the input shaft rotational speed $N_{IN}$ cannot be detected. That is, the predetermined vehicle speed V' is lower than the lowest vehicle speed at which a predetermined feedback control can be executed. The predetermined vehicle speed V' is set to, for example, approximately 2 km/h.

Figure 6:
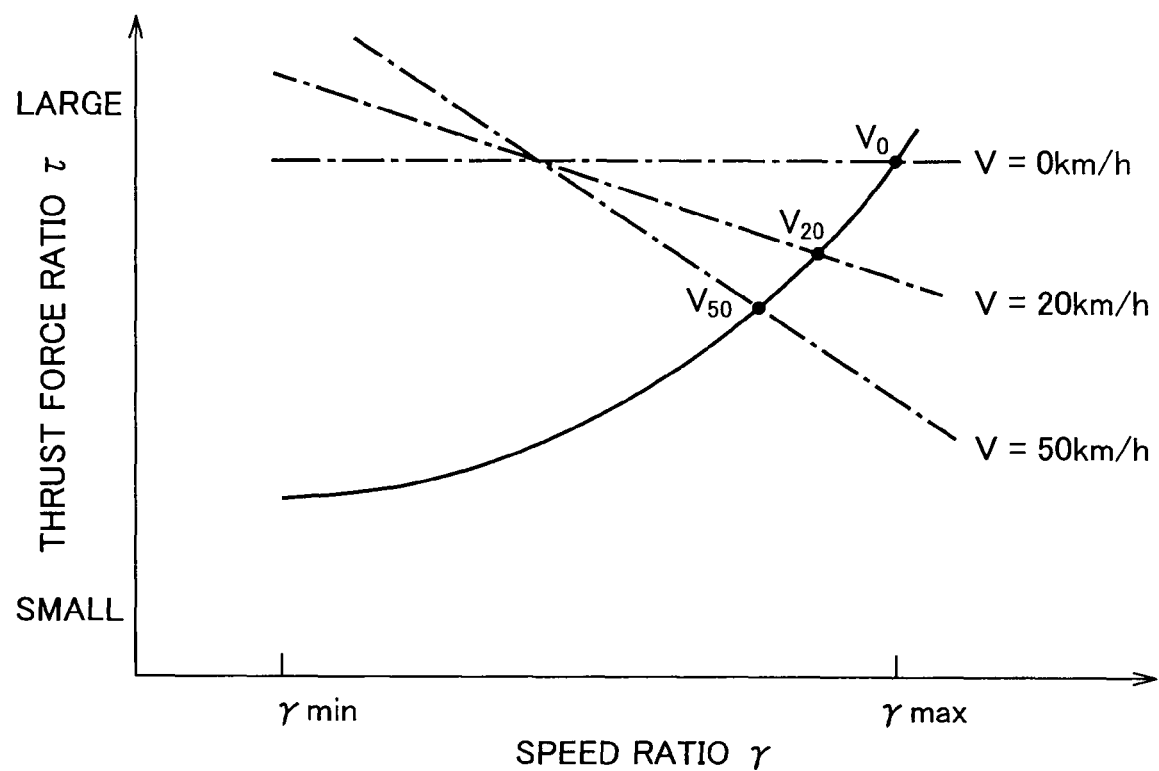
FIG. 6 shows a relation between the speed ratio and a thrust force ratio, which is set in advance using a vehicle speed as a parameter, and stored in advance.

FIG. 6 shows an example of a relation between the speed ratio γ and the thrust force ratio τ set using the vehicle speed V as a parameter. The relation is set and stored in advance. The chain line showing the vehicle speed V in FIG. 6 is set using, as the parameter, the thrust force ratio τ calculated taking into account the centrifugal hydraulic pressures in the primary hydraulic cylinder 42c and the secondary hydraulic cylinder 46c. A predetermined speed ratio, at which the speed ratio γ is maintained when the confinement control is executed, is determined using the point of intersection ($V_0$, $V_{20}$, $V_{50}$) between the chain line and the solid line. For example, as shown in FIG. 6, in the continuously variable transmission 18 according to the embodiment, if the confinement control is executed when the vehicle speed V is 0 km/h, that is, when the vehicle is stopped, the speed ratio γ is maintained at the maximum speed ratio γmax, which is the predetermined speed ratio.

Figure 7:
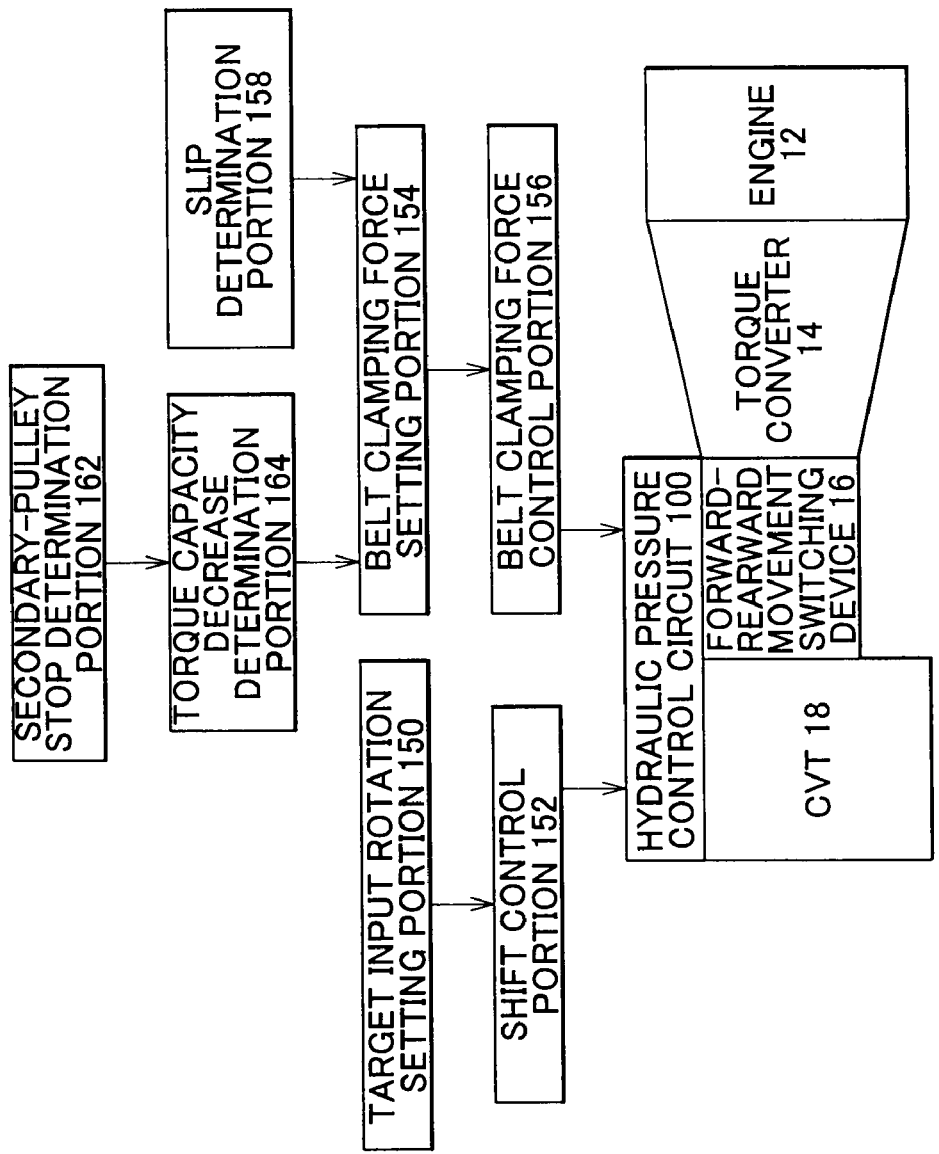
FIG. 7 is a functional block diagram showing main control functions performed by an electronic control unit in FIG. 2.

FIG. 7 is a functional block diagram showing main control functions performed by the electronic control unit 50. In FIG. 7, a target input rotation setting portion 150 sequentially sets the target input shaft rotational speed $N_{IN}$*, which is the target of the input shaft rotational speed $N_{IN}$, based on the vehicle state indicated by the actual vehicle speed V and the actual accelerator pedal operation amount $A_{CC}$ using, for example, the prestored shift map shown in FIG. 4.

A shift control portion 152 executes a feedback control of the shift of the continuously variable transmission 18 according to the rotational speed difference $\Delta N_{IN}$ ($=N_{IN}*-N_{IN}$) so that the actual input shaft rotational speed $N_{IN}$ matches the target input shaft rotational speed $N_{IN}$* set by the target input rotation setting portion 150, that is, the rotational speed difference $\Delta N_{IN}$ is reduced to zero. That is, the shift control portion 152 continuously changes the speed ratio γ by outputting the shift control command signal (the hydraulic pressure command) $S_T$ to the hydraulic pressure control circuit 100. The shift control command signal $S_T$ changes the widths of the V-grooves of the variable pulleys 42 and 46 by controlling the flow rate of the hydraulic fluid supplied to, and discharged from the primary hydraulic cylinder 42c that is a drive-side hydraulic cylinder.

A belt clamping force setting portion 154 sets the required secondary pressure Pd* based on the vehicle state indicated by the actual accelerator pedal operation amount $A_{CC}$ and the actual speed ratio γ ($=N_{IN}/N_{OUT}$) calculated by the electronic control unit 50 based on the actual input shaft rotational speed $N_{IN}$ and the output shaft rotational speed $N_{OUT}$. That is, the belt clamping force setting portion 154 sets the required secondary pressure Pd* based on the vehicle state using, for example, the belt clamping force map that is empirically set and stored in advance, as shown in FIG. 5. In other words, the belt clamping force setting portion 154 sets the required secondary pressure Pd* for the secondary hydraulic cylinder 46c.

A belt clamping force control portion 156 increases/decreases the secondary pressure Pd for the secondary hydraulic cylinder 46c to obtain the required secondary pressure Pd* set by the belt clamping force setting portion 154, by outputting, to the hydraulic pressure control circuit 100, the clamping force control command signal $S_B$ that adjusts the secondary pressure Pd for the secondary hydraulic cylinder 46c.

The hydraulic control circuit 100 controls the amount of the hydraulic fluid supplied to the primary hydraulic cylinder 42c, which is the drive-side hydraulic cylinder, and the amount of the hydraulic fluid discharged from the primary hydraulic cylinder 42c so that the continuously variable transmission 18 shifts according to the shift control command signal $S_T$, by operating the solenoid valve DS1 and the solenoid valve DS2. In addition, the hydraulic control circuit 100 adjusts the secondary pressure Pd by operating the linear solenoid valve SLS so that the secondary pressure Pd is increased/decreased according to the clamping force control command signal $S_B$.

In addition to the above-described function, the shift control portion 152 executes the confinement control that maintains the ratio between the primary pressure Pin and the secondary pressure Pd at the predetermined ratio using the thrust-force-ratio control valve 118, instead of executing the normal shift control, that is, the feedback control of the speed ratio γ, which reduces the rotational speed difference $\Delta N_{IN}$ to zero, on the condition that the vehicle speed V is equal to or lower than the predetermined vehicle speed V'. That is, the shift control portion 152 controls the speed ratio γ of the continuously variable transmission 18 to the predetermined speed ratio by outputting, to the hydraulic pressure control circuit 100, a shift command (a confinement control command) signal $S_T'$ for the shift control at the low vehicle speed. The shift control at the low vehicle speed makes the speed ratio γ of the continuously variable transmission 18 equal to the predetermined speed ratio by placing the speed ratio control valve UP 114 and the speed ratio control valve DN 116 in the closed states so that the hydraulic fluid is confined in the primary hydraulic cylinder 42c.

According to the confinement control command signal $S_T'$, the hydraulic pressure control circuit 100 is prevented from operating the solenoid valve DS1 and the solenoid valve DS2, and thus, the speed ratio control valve UP 114 and the speed ratio control valve DN 116 are placed in the closed states. In addition, the thrust-force-ratio control valve 118 outputs the thrust-force-ratio control hydraulic pressure Pτ so that the ratio between the primary pressure Pin and the secondary pressure Pd is maintained at the predetermined ratio.

A portion of the transmission belt 48, which moves from the primary pulley 42 toward the secondary pulley 46, may be loose (hereinafter, the portion will be referred to as "loose portion"), and a portion of the transmission belt 48, which moves from the secondary pulley 46 toward the primary pulley 42, may be tight (hereinafter, the portion will be referred to as "tight portion"). In this case, if the torque input to the primary pulley 42 is increased when the secondary pulley 46 is in a stopped state, for example, when the vehicle is in the stopped state, the torque is transmitted to a surface of the transmission belt 48, which contacts the primary pulley 42, and the transmission belt 48 is pushed toward the secondary pulley 46. However, the secondary pulley 46 is not rotated, and a surface of the transmission belt 48, which contacts the secondary pulley 46, is not moved. Therefore, the tension of the tight portion is increased, and the tension of the loose portion is decreased. Then, if the torque input to the primary pulley 42 is decreased while the secondary pulley 46 remains stopped, the force that pushes the transmission belt 48 is decreased. Because large torque has been input to the primary pulley 42 and the torque is decreased, the tension of the tight portion is decreased, and the tension of the loose portion is increased, and at the same time, the pressure between the transmission belt 48 and the pulleys is decreased. If the pressure between the transmission belt 48 and the pulleys is decreased, the torque capacity is decreased. Therefore, if the input torque is increased again, the input torque exceeds the torque capacity, and as a result, the transmission belt 48 may slip.

Accordingly, when the secondary pulley 46 is in the stopped state, on the condition that the torque input to the primary pulley 42 is increased and then decreased, the belt clamping force control portion 156 increases the primary pressure Pin to a value higher than a primary pressure Pin* set by the shift control portion 152, to avoid the slip of the transmission belt 48.

More specifically, a secondary-pulley stop determination portion 162 determines whether the secondary pulley 46 is in the stopped state, for example, based on whether the vehicle speed V detected by the vehicle speed sensor 58 (i.e., the output shaft rotational speed $N_{OUT}$) is equal to or lower than the predetermined vehicle speed, that is, the vehicle speed V is determined to be substantially zero.

A torque capacity decrease determination portion 164 determines whether the torque input to the primary pulley 42 is increased and then decreased while the secondary pulley 46 is in the stopped state. For example, the torque capacity decrease determination portion 164 determines whether the torque input to the primary pulley 42 is increased and then decreased, based on whether the accelerator pedal operation amount $A_{CC}$ detected by the accelerator pedal operation amount sensor 66, which is one factor of input torque information, is increased by an amount equal to or larger than a first amount and then decreased by an amount equal to or larger than a second amount, while the secondary-pulley stop determination portion 162 determines that the secondary pulley 46 is in the stopped state. The first amount may be smaller than the second amount. It may be determined whether the torque input to the primary pulley 42 is increased and then decreased, based on the throttle valve opening amount $\theta_{TH}$ detected by the throttle sensor 60.

A slip determination portion 158 determines whether the transmission belt 48 slips on the pulley(s). For example, an ideal secondary pulley rotational speed, which is an ideal rotational speed of the secondary pulley 46 when the transmission belt 48 does not slip on the pulley(s), is calculated based on the rotational speed of the primary pulley 42 detected by the input shaft rotational speed sensor 56 and the speed ratio. If the rotational speed of the secondary pulley 46 detected by the vehicle speed sensor 58 differs from the ideal secondary pulley rotational speed, the slip determination portion 158 determines that the transmission belt 48 slips on the pulley(s).

On the condition that the torque capacity decrease determination portion 164 determines that the torque input to the primary pulley 42 is increased and then decreased while the secondary-pulley stop determination portion 162 determines that the secondary pulley 46 is in the stopped state, the belt clamping force control portion 156 increases the primary pressure Pin to a value higher than the normal primary pressure Pin* set by the shift control portion 152 by a predetermined value. The predetermined value may be a constant value that is empirically set to prevent the slip of the transmission belt 48, or the predetermined value may be empirically set so that the predetermined value is increased with an increase in the number of times it is determined that the torque capacity is decreased. In the embodiment, the primary pressure Pin is increased, because the pressure between the primary pulley 42 and the transmission belt 48 is unlikely to be increased even if the secondary pressure Pd is increased while the secondary pulley 46 is in the stopped state. However, the secondary pressure Pd may be increased, or both of the primary pressure Pin and the secondary pressure Pd may be increased.

Further, when the slip determination portion 158 determines that the transmission belt 48 slips on the pulley(s) after one of the primary pressure Pin and the secondary pressure Pd is increased, the belt clamping force control portion 156 may increase the other of the primary pressure Pin and the secondary pressure Pd.

Figure 8:
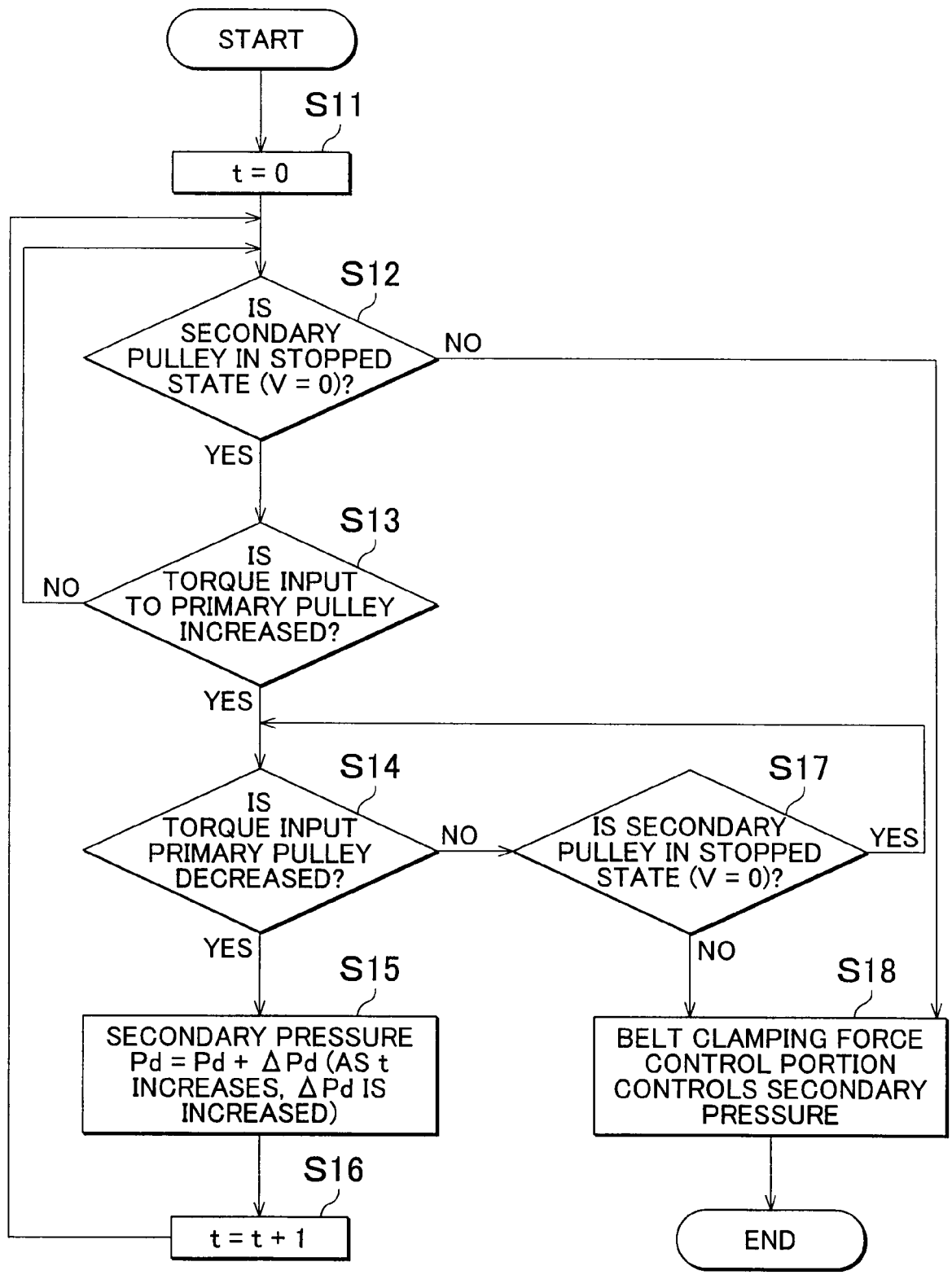
FIG. 8 is an example of a flowchart, which shows a main portion of a control operation executed by the electronic control unit in FIG. 2, that is, a control operation executed to optimally control the belt clamping force in a range in which a transmission belt does not slip.

FIG. 8 is a flowchart showing an example of a control operation executed by the belt clamping force control portion 156. The control operation is executed to increase the secondary pressure Pd, when it is determined that the torque capacity is decreased by determining that the torque input to the primary pulley 42 is increased and then decreased while the secondary pulley 46 is in the stopped state. For example, the control operation is executed in an extremely short cycle, for example, in a cycle of several seconds to several tens of seconds, and the control operation is repeatedly executed.

First, in step S11, the value of a variable "t" is set to 0. The variable "t" indicates the number of times it is determined that the torque capacity is decreased while the secondary pulley 46 is in the stopped state. The variable "t" may be an integer number.

After the process in step S11 is executed, it is determined whether the secondary pulley 46 is in the stopped state, for example, based on whether the vehicle speed V (the output shaft rotational speed $N_{OUT}$) is equal to or lower than the predetermined speed, that is, the vehicle speed V is determined to be substantially zero, in step S12. When a negative determination is made in step S12, the routine proceeds to step S18. In step S18, the belt clamping force control portion 156 controls the secondary pressure Pd. Then, the routine ends.

When an affirmative determination is made in step S12, it is determined whether the torque input to the primary pulley 42 is increased, for example, based on whether the accelerator pedal operation amount $A_{CC}$ detected by the accelerator pedal operation amount sensor 66 is increased by a value equal to or larger than a predetermined value, in step S13. When a negative determination is made in step S13, the routine returns to step S12.

When an affirmative determination is made in step S13, it is determined whether the torque input to the primary pulley 42 is decreased, for example, based on whether the accelerator pedal operation amount $A_{CC}$ detected by the accelerator pedal operation amount sensor 66 is decreased by a value equal to or larger than a predetermined value, in step S14. When a negative determination is made in step S14, the routine proceeds to step S17. In step S17, it is determined whether the secondary pulley 46 is in the stopped state, as in step S12. When an affirmative determination is made in step S17, the routine returns to step S14. When a negative determination is made in step S17, the belt clamping force control portion 156 controls the secondary pressure Pd in step S18, and then, the routine ends.

When an affirmative determination is made in step S14, the secondary pressure Pd is increased to a value that is higher than the current secondary pressure Pd by a predetermined value ΔPd in step S15. The predetermined value ΔPd is changed according to the value of "t". As the value of "t" increases, the predetermined value ΔPd is increased.

After the process in step S15 is executed, the routine proceeds to step S16. In step S16, the value of "t" is set to a value obtained by adding 1 to the current value of "t". Then, the routine returns to step S12.

In the control operation shown by FIG. 8, the predetermined value ΔPd, by which the secondary pressure Pd is increased, is increased with an increase in the number of times it is determined that the torque input to the primary pulley 42 is increased and then decreased while the secondary pulley 46 is in the stopped state. Therefore, even when a decrease amount, by which the torque capacity is decreased, is increased, it is possible to reliably suppress the slip of the transmission belt 48.

Figure 9:
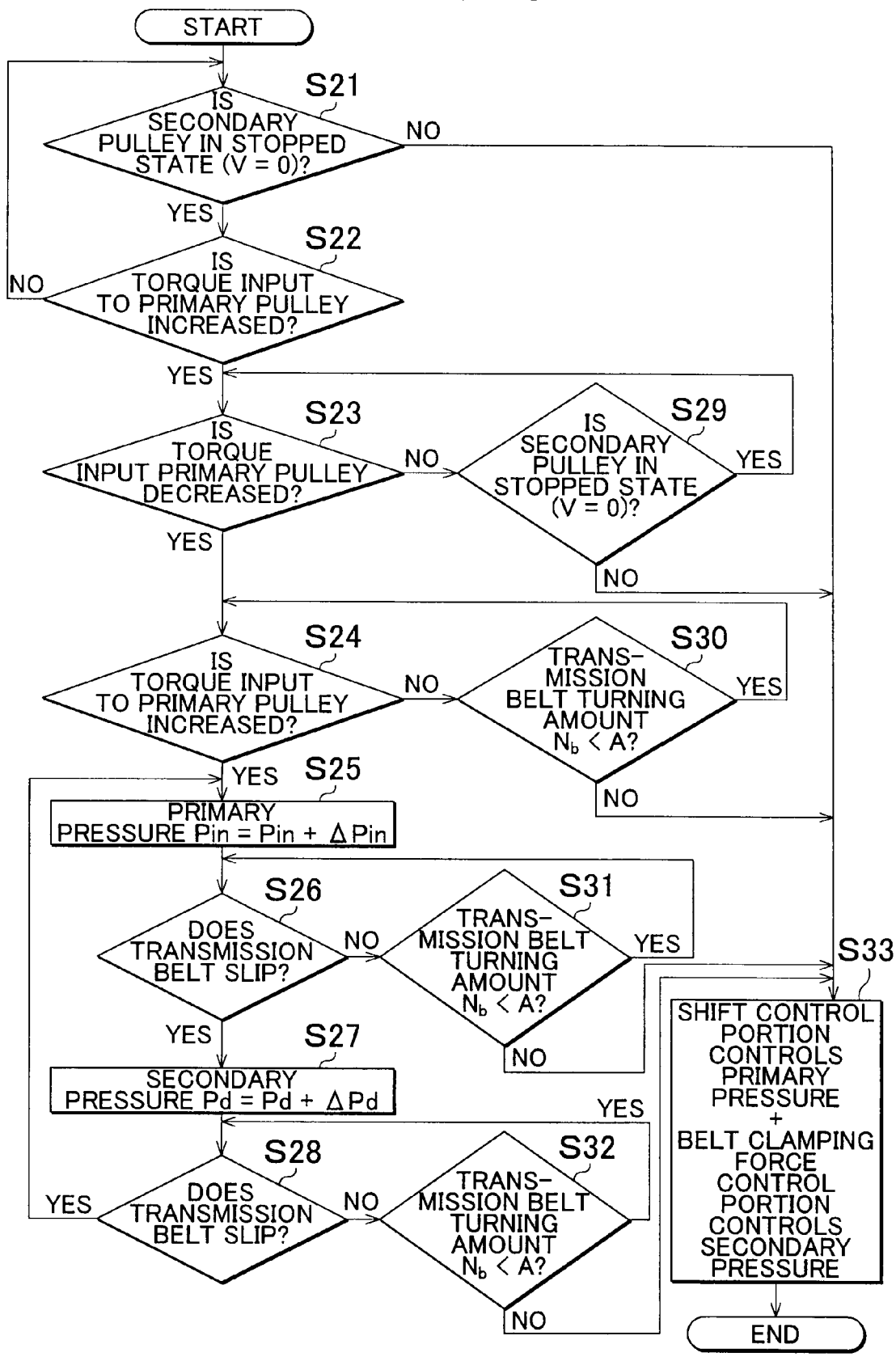
FIG. 9 is another example of a flowchart, which shows a main portion of a control operation executed by the electronic control unit in FIG. 2, that is, a control operation executed to optimally control the belt clamping force in the range in which the transmission belt does not slip.

FIG. 9 is a flowchart showing another example of a control operation executed by the belt clamping force control portion 156. The control operation is executed to increase the primary pressure Pin, when it is determined that the torque capacity is decreased by determining that the torque input to the primary pulley 42 is increased and then decreased while the secondary pulley 46 is in the stopped state. For example, the control operation is executed in an extremely short cycle, for example, in a cycle of several seconds to several tens of seconds, and the control operation is repeatedly executed.

First, in step S21, it is determined whether the secondary pulley 46 is in the stopped state, for example, based on whether the vehicle speed V (the output shaft rotational speed $N_{OUT}$) is equal to or lower than the predetermined speed, that is, the vehicle speed V is determined to be substantially zero. When a negative determination is made in step S21, the routine proceeds to step S33. In step S33, the shift control portion 152 controls the primary pressure Pin, and the belt clamping force control portion 156 controls the secondary pressure Pd. Then, the routine ends.

When an affirmative determination is made in step S21, it is determined whether the torque input to the primary pulley 42 is increased, for example, based on whether the accelerator pedal operation amount $A_{CC}$ detected by the accelerator pedal operation amount sensor 66 is increased by a value equal to or larger than a predetermined value, in step S22. When a negative determination is made in step S22, the routine returns to step S21.

When an affirmative determination is made in step S22, it is determined whether the torque input to the primary pulley 42 is decreased, for example, based on whether the accelerator pedal operation amount $A_{CC}$, which is the operation amount of the accelerator pedal operated by a driver, and which is detected by the accelerator pedal operation amount sensor 66, is decreased by a value equal to or larger than a predetermined value, in step S23. When a negative determination is made in step S23, the routine proceeds to step S29. In step S29, it is determined whether the secondary pulley 46 is in the stopped state, as in step S21. When an affirmative determination is made in step S29, the routine returns to step S23. When a negative determination is made in step S29, the shift control portion 152 controls the primary pressure Pin, and the belt clamping force control portion 156 controls the secondary pressure Pd in step S33, and then, the routine ends.

When an affirmative determination is made in step S23, it is determined whether the torque input to the primary pulley 42 is increased in step S24, as in step S22. A threshold value used to determine whether the torque is increased in step S24 may be smaller than the threshold value used to determine whether the torque is increased in step S22. When a negative determination is made in step S24, the routine proceeds to step S30. In step S30, it is determined whether a turning amount $N_b$, by which the transmission belt 48 is turned after an affirmative determination is made in step S21, is smaller than a predetermined turning amount A. The turning amount $N_b$ is calculated, for example, based on the vehicle speed V detected by the vehicle speed sensor 58 and the speed ratio. When an affirmative determination is made in step S30, the routine returns to step S24. When a negative determination is made in step S30, the shift control portion 152 controls the primary pressure Pin, and the belt clamping force control portion 156 controls the secondary pressure Pd in step S33. Then, the routine ends. When an affirmative determination is made in step S24, the primary pressure Pin is increased to a value higher than the current primary pressure Pin by the predetermined value ΔPin, in step S25.

After the process in step S25 is executed, it is determined whether the transmission belt 48 slips on the pulley(s) in step S26. For example, the ideal secondary rotational speed, which is the ideal rotational speed of the secondary pulley 46 when the transmission belt 48 does not slip on the pulley(s), is calculated based on the rotational speed of the primary pulley 42 and the speed ratio. It is determined whether the transmission belt 48 slips on the pulley(s), based on whether the rotational speed of the secondary pulley 46 detected by the vehicle speed sensor 58 differs from the ideal secondary rotational speed. When a negative determination is made in step S26, the routine proceeds to step S31. In step S31, it is determined whether the turning amount $N_b$, by which the transmission belt 48 is turned after an affirmative determination is made in step S21, is smaller than the predetermined turning amount A, as in step S30. When an affirmative determination is made in step S31, the routine returns to step S26. When a negative determination is made in step S31, the shift control portion 152 controls the primary pressure Pin, and the belt clamping force control portion 156 controls the secondary pressure Pd in step S33. Then, the routine ends.

When an affirmative determination is made in step S26, the secondary pressure Pd is increased to a value higher than the current secondary pressure Pd by the predetermined value ΔPd in step S27.

After the process in step S27 is executed, the routine proceeds to step S28. In step S28, it is determined whether the transmission belt 48 slips on the pulley(s), as in step S26. When an affirmative determination is made in step S28, the routine returns to step S25. When a negative determination is made in step S28, the routine proceeds to step S32. In step S32, it is determined whether the turning amount Nb, by which the transmission belt 48 is turned after an affirmative determination is made in step S21, is smaller than the predetermined turning amount A, as in step S31. When an affirmative determination is made in step S32, the routine returns to step S28. When a negative determination is made in step S32, the shift control portion 152 controls the primary pressure Pin, and the belt clamping force control portion 156 controls the secondary pressure Pd in step S33. Then, the routine ends.

In the control operation shown by FIG. 9, if it is determined that the torque input to the primary pulley 42 is increased, and then decreased, and then increased again while the secondary pulley 46 is in the stopped state, first, the primary pressure Pin is increased. Therefore, it is possible to more effectively prevent the slip of the transmission belt 48 for the following reason. The pressure between the transmission belt 48 and the pulleys is decreased because large torque has been applied to the primary pulley 42 and the torque is decreased. Therefore, it is considered that the pressure between the transmission belt 48 and the primary pulley 42 is likely to decrease.

Also, until it is determined that the torque input to the primary pulley 42 is increased, and then decreased, and then increased again while the secondary pulley 46 is in the stopped position, the shift control portion 152 controls the primary pressure Pin, and the belt clamping force control portion 156 controls the secondary pressure Pd. This reduces the period during which the primary pressure Pin and the secondary pressure Pd are increased. Thus, it is possible to more effectively reduce a friction loss and a pump load. This is because it is considered that the transmission belt 48 slips when the torque input to the primary pulley 42 exceeds the torque capacity after the torque capacity is decreased.

Also, when the turning amount $N_b$, by which the transmission belt 48 is turned, is equal to or larger than the predetermined turning amount A, the shift control portion 152 controls the primary pressure Pin, and the belt clamping force control portion 156 controls the secondary pressure Pd. This reduces the period during which the primary pressure Pin and the secondary pressure Pd are increased. Thus, it is possible to more effectively prevent the slip of the transmission belt 48, and to reduce a friction loss and a pump load. This is because as the transmission belt 48 is turned, the pressure between the transmission belt 48 and the pulleys, which has been decreased due to the increase and decrease in the torque input to the primary pulley 42, is gradually increased, and thus, the torque capacity is increased, that is, the torque capacity, which has been decreased, is increased.

Also, when it is determined that the transmission belt 48 slips, the primary pressure Pin and the secondary pressure Pd are alternately increased. Therefore, it is possible to prevent a change in the speed ratio due to an excessive increase in the primary pressure Pin, and to suppress the slip of the transmission belt 48.

As described above, in the embodiment, on the condition that the torque capacity decrease determination portion 164 determines that the torque input to the primary pulley 42 is increased and then decreased while the secondary-pulley stop determination portion 162 determines that the secondary pulley 46 is in the stopped state, the belt clamping force control portion 156 increases the current primary pressure Pin to a value that is higher than the normal primary pressure Pin* set by the shift control portion 152 by the predetermined value, or increases the current secondary pressure Pd to a value that is higher than the required secondary pressure Pd* set by the belt claming force setting portion 154 by the predetermined value. That is, when the torque input to the primary pulley 42 is increased and then decreased, and accordingly, the torque capacity is decreased and the transmission belt 48 is likely to slip, the primary pressure Pin or the secondary pressure Pd is increased. Therefore, it is not necessary to constantly apply a large pressure to prevent the slip of the transmission belt 48. Thus, the primary pressure Pin or the secondary pressure Pd is increased during the required minimum period. This improves fuel efficiency.

Although the embodiment of the invention has been described in detail with reference to the drawings, the invention may be realized in other embodiments. For example, although the secondary-pulley stop determination portion 162, which determines whether the secondary pulley 46 is in the stopped state, is employed in the above-described embodiment, a secondary-pulley substantially stop determination portion, which determines whether the secondary pulley 46 is in a substantially stopped state, may be employed. When the secondary-pulley substantially stop determination portion is employed, in steps (S12, S19, S21, and S29) in which a condition that the secondary pulley 46 is in the stopped state is used, a condition that the secondary pulley 46 is in the substantially stopped state may be used. A condition that the rotational speed of the secondary pulley 46 is equal to or lower than a predetermined rotational speed may be used. For example, the secondary-pulley substantially stop determination portion determines that the secondary pulley 46 is in the substantially stop state when the rotational speed of the secondary pulley 46 detected by the vehicle speed sensor 58 is lower than the predetermined rotational speed.

In the above-described embodiment, for example, the input shaft rotational speed $N_{IN}$ is used as the rotational speed of the predetermined rotational member, and the target input shaft rotational speed $N_{IN}$* related to the input shaft rotational speed $N_{IN}$ is also used. However, instead of the input shaft rotational speed $N_{IN}$ and the target input shaft rotational speed $N_{IN}$*, the engine speed $N_E$ and a target engine speed $N_E$* related to the engine speed $N_E$, or the turbine rotational speed $N_T$ and a target turbine rotational speed $N_T$* related to the turbine rotational speed $N_T$ may be used. Accordingly, although the input shaft rotational speed sensor 56 is used as the rotational speed sensor in the above-described embodiment, an appropriate rotational speed sensor, which detects the rotational speed that needs to be controlled, may be provided.

In the above-described embodiment, the torque converter 14 is employed as a hydraulic power transmission device. However, other hydraulic power transmission devices, such as a fluid coupling that does not have the function of amplifying torque, may be employed. Also, the hydraulic power transmission device need not necessarily be provided.

The above-described embodiment may be applied to a belt that transmits drive power. It is more effective to apply the above-described embodiment to a belt that includes a ring and elements for the following reason. In the case where the belt including the ring and elements is employed, when the torque input to the primary pulley is increased while the secondary pulley is in the stopped state, the torque is transmitted to the elements that contact the primary pulley, and the elements are pushed toward the secondary pulley. However, the secondary pulley is not rotated, and the elements that contact the secondary pulley are not moved. Therefore, the distance between the elements becomes short in a portion of the belt. Then, when the torque input to the primary pulley is decreased, the force that pushes the elements is decreased. Because large torque has been applied to the portion of the belt in which the distance between the elements has been short, and the torque is decreased, the pressure between the elements and the pulleys is decreased.

In the above-described embodiment, the primary pressure Pin or the secondary pressure Pd is increased, when the torque input to the primary pulley 42 is decreased while the secondary pulley 46 is in the stopped state. However, the primary pressure Pin or the secondary pressure Pd may be increased, when the torque input to the secondary pulley 46 is decreased while the primary pulley 42 is in the stopped state.

The above-described embodiment is to be considered as illustrative and not restrictive. The invention may be realized in various embodiments modified based on knowledge of persons skilled in the art.

What is claimed is:

1. A control apparatus for a continuously variable transmission that includes a pair of a primary pulley and a secondary pulley, wherein a transmission belt is wound on the primary pulley and the secondary pulley, and a shift of the continuously variable transmission is performed by changing effective diameters of the primary pulley and the secondary pulley, the control apparatus comprising:

a clamping force increase portion that increases a belt clamping force when it is determined that a torque capacity is decreased by determining that drive power input to the primary pulley is decreased by an amount equal to or larger than a predetermined amount while the secondary pulley is in a stopped state or a substantially stopped state, as compared to when it is determined that the torque capacity is not decreased.

2. The control apparatus according to claim 1, wherein the clamping force increase portion suppresses an increase in the belt clamping force during a period from when it is determined that the torque capacity is decreased until when the drive power input to the primary pulley is increased.

3. The control apparatus according to claim 1, wherein when it is determined that a turning amount, by which the transmission belt is turned, has reached a predetermined turning amount, the clamping force increase portion suppresses an increase in the belt clamping force.

4. The control apparatus according to claim 1, wherein the clamping force increase portion increases the belt clamping force with an increase in a number of times it is determined that the torque capacity is decreased.

5. The control apparatus according to claim 1, wherein
when it is determined that the torque capacity is decreased,
the clamping force increase portion increases the belt
clamping force of one of the primary pulley and the
secondary pulley, as compared to when it is determined
that the torque capacity is not decreased.

6. The control apparatus according to claim 5, wherein
when it is determined that the transmission belt slips after
the belt clamping force of the one of the primary pulley
and the secondary pulley is increased, the clamping
force increase portion increases the belt clamping force
of the other of the primary pulley and the secondary
pulley.

7. The control apparatus according to claim 5, wherein
the clamping force of the one of the primary pulley and the
secondary pulley is the clamping force of the primary
pulley.

8. The control apparatus according to claim 1, wherein
the transmission belt includes a ring and an element that is
engaged with the ring; and
the transmission belt transmits the drive power using the
element.

9. The control apparatus according to claim 1, wherein
when it is determined that the torque capacity is decreased
by determining that the drive power input to the primary
pulley is decreased by an amount equal to or larger than
the predetermined amount after the drive power input to
the primary pulley is increased while the secondary pulley is in the stopped state or the substantially stopped
state, the clamping force increase portion increases the
belt clamping force, as compared to when it is determined that the torque capacity is not decreased.

10. A method of controlling a continuously variable transmission that includes a pair of a primary pulley and a secondary pulley, wherein a transmission belt is wound on the primary pulley and the secondary pulley, and a shift of the continuously variable transmission is performed by changing effective diameters of the primary pulley and the secondary pulley, the method comprising:
determining whether the secondary pulley is in a stopped state or a substantially stopped state;
determining whether a torque capacity is decreased by determining whether drive power input to the primary pulley is decreased by an amount equal to or larger than a predetermined amount while it is determined that the secondary pulley is in the stopped state or the substantially stopped state; and
increasing a belt clamping force when it is determined that the torque capacity is decreased, as compared to when it is determined that the torque capacity is not decreased.

11. The method according to claim 10, wherein
an increase in the belt clamping force is suppressed during a period from when it is determined that the torque capacity is decreased until when the drive power input to the primary pulley is increased.

12. The method according to claim 10, wherein
when it is determined that a turning amount, by which the transmission belt is turned, has reached a predetermined turning amount, an increase in the belt clamping force is suppressed.

13. The method according to claim 10, wherein
the belt clamping force is increased with an increase in a number of times it is determined that the torque capacity is decreased.

14. The method according to claim 10, wherein
it is determined whether the torque capacity is decreased by determining whether the drive power input to the primary pulley is decreased by an amount equal to or larger than the predetermined amount after the drive power input to the primary pulley is increased while it is determined that the secondary pulley is in the stopped state or the substantially stopped state.

15. A non-transitory computer-readable storage medium storing a computer-readable code adapted to implement a method of controlling a continuously variable transmission that includes a pair of a primary pulley and a secondary pulley, wherein a transmission belt is wound on the primary pulley and the secondary pulley, and a shift of the continuously variable transmission is performed by changing effective diameters of the primary pulley and the secondary pulley, the method comprising:
determining whether the secondary pulley is in a stopped state or a substantially stopped state;
determining whether a torque capacity is decreased by determining whether drive power input to the primary pulley is decreased by an amount equal to or larger than a predetermined amount while it is determined that the secondary pulley is in the stopped state or the substantially stopped state; and
increasing a belt clamping force when it is determined that the torque capacity is decreased, as compared to when it is determined that the torque capacity is not decreased.

16. The non-transitory computer-readable storage medium according to claim 15, wherein
an increase in the belt clamping force is suppressed during a period from when it is determined that the torque capacity is decreased until when the drive power input to the primary pulley is increased.

17. The non-transitory computer-readable storage medium according to claim 15, wherein
when it is determined that a turning amount, by which the transmission belt is turned, has reached a predetermined turning amount, an increase in the belt clamping force is suppressed.

18. The non-transitory computer-readable storage medium according to claim 15, wherein
the belt clamping force is increased with an increase in a number of times it is determined that the torque capacity is decreased.

19. The non-transitory computer-readable storage medium according to claim 15, wherein
it is determined whether the torque capacity is decreased by determining whether the drive power input to the primary pulley is decreased by an amount equal to or larger than the predetermined amount after the drive power input to the primary pulley is increased while it is determined that the secondary pulley is in the stopped state or the substantially stopped state.

* * * * *